(12) United States Patent
Hoffman et al.

(10) Patent No.: US 7,827,641 B2
(45) Date of Patent: Nov. 9, 2010

(54) TELESCOPING RAMP

(75) Inventors: Patrick Hoffman, Arlington, TX (US); Tom Murphy, Arlington, TX (US)

(73) Assignee: Solvit Products, LP, Arlington, TX (US)

( * ) Notice: Subject to any disclaimer, the term of this patent is extended or adjusted under 35 U.S.C. 154(b) by 880 days.

(21) Appl. No.: 11/593,411

(22) Filed: Nov. 6, 2006

(65) Prior Publication Data

US 2008/0263790 A1 Oct. 30, 2008

Related U.S. Application Data

(60) Provisional application No. 60/782,475, filed on Mar. 15, 2006.

(51) Int. Cl.
*E01D 1/00* (2006.01)
(52) U.S. Cl. ..................................... 14/69.5
(58) Field of Classification Search ................. 14/69.5; 296/61
See application file for complete search history.

(56) References Cited

U.S. PATENT DOCUMENTS

| | | |
|---|---|---|
| 701,320 A | 6/1902 | Fisher |
| 712,284 A | 10/1902 | Fisher |
| 1,364,581 A | 1/1921 | Ramsey |
| 4,302,725 A * | 11/1981 | Nubani ........................ 324/404 |
| 4,528,711 A | 7/1985 | Packer |
| 4,601,632 A | 7/1986 | Agee |
| 4,628,561 A | 12/1986 | Kushniryk |
| 4,726,516 A | 2/1988 | Cree |
| 4,900,217 A | 2/1990 | Nelson |
| 5,077,852 A | 1/1992 | Karlsson |
| 5,137,114 A * | 8/1992 | Yde et al. ...................... 182/49 |
| 5,244,335 A | 9/1993 | Johns |
| 5,312,149 A | 5/1994 | Boone |
| 5,803,523 A | 9/1998 | Clark et al. |
| 5,813,071 A | 9/1998 | Breslin et al. |
| 6,119,634 A | 9/2000 | Myrick |
| 6,267,082 B1 | 7/2001 | Naragon et al. |
| 6,345,950 B1 | 2/2002 | Gerwitz |
| 6,484,344 B1 * | 11/2002 | Cooper ........................ 14/71.1 |
| 7,284,781 B2 * | 10/2007 | Grant .......................... 296/61 |
| 2003/0213072 A1 | 11/2003 | Myrick |

OTHER PUBLICATIONS

ATVramps.com internet printout.
Cargogear.com internet printout.
JCWhitney.com internet printout.

* cited by examiner

*Primary Examiner*—Raymond W Addie
(74) *Attorney, Agent, or Firm*—Espinosa | Trueba, PL; William R. Trueba, Jr.; Michael E. Tschupp (57) ABSTRACT

The present invention includes a telescoping ramp that includes two ramp members that fit one atop the other such that the two members may be extended out or collapsed together. The first, outer ramp member has channels on either side of a substantially planar surface. The channels of the outer ramp member are structured to capture the rails on either side of a second ramp member. An inverted J-shaped channel is formed along each of the longitudinally aligned sides of the first ramp member. One embodiment includes inverted J-shaped channels that are dimensionally larger near the side that engages the other ramp member. The second ramp member is sized to between the inverted J-shaped channels and includes protruding rail-like members formed along each of its longitudinally aligned sides. The protruding members are complementarily shaped to slide and fit within a corresponding inverted J-shaped channel of the first ramp member.

52 Claims, 10 Drawing Sheets

TELESCOPING RAMP

CROSS-REFERENCE TO RELATED APPLICATIONS

The present application claims priority to U.S. provisional patent application No. 60/782,475 filed Mar. 13, 2006. The entire disclosure of U.S. provisional patent application No. 60/782,475 is incorporated herein by reference.

FIELD OF THE INVENTION

The present invention relates to a telescoping ramp, and more particularly, a portable, lightweight, adjustable and telescoping ramp which can be used to make traversing a short span easier.

BACKGROUND OF THE INVENTION

Many have created ramps, including telescoping ramps, that can be used for a multitude of purposes. For example, U.S. Pat. No. 5,244,335 to Johns discloses a telescopic tailgate ramp for the back of a pickup truck. Similarly, U.S. Pat. No. 5,813,071 to Breslin, et al., discloses a telescopic truck loading ramp assembly to facilitate the loading and unloading of a truck.

U.S. Pat. No. 6,345,950 to Gewirtz discloses a ramp assembly for spanning between two surfaces. The ramp assembly includes two elongated runners with angular support members integral with each end of each runner for engaging an upper surface and lower surface. However, the angular supports disclosed by the Gewirtz reference are not supported other than through their being integrated to the load bearing surface of the runners with no lateral support from the sides of the runners. Gewirtz discloses nested runners wherein the inner runner includes tracks that are integral with the runner and have a cross-sectional profile that is inclined less than 30 degrees to the vertical relative to the cross-sectional profile of the channel of the complementary runner. The purpose of the angle of the track is to lock the complementary runners when weight is applied to the load bearing surface. The Gewirtz ramp lacks structural support at the angular support members and its integrated structure makes it difficult to construct out of light weight materials. The angular deployment of its tracks on one of its runners makes it susceptible to collapse when heavier objects or animals are placed on the ramp in its extended state.

The telescoping ramp of the present invention solves the shortcomings of the past telescoping ramps.

OBJECTS OF THE INVENTION

The following section of the written description describes some of the objects of the present invention, but the section is not exhaustive of all of invention's objects.

It is an object of the present invention to provide a telescoping ramp that can be easily used and transported.

It is a further object of the present invention to provide a telescoping ramp that can be easily deployed.

It is an object of the present invention to provide a telescoping ramp having two ramp members that slidingly engage so that in a closed position one member is atop the other and in an extended position, a portion of one member engages a reinforced portion of the other ramp member.

It is a further object of the present invention to provide a telescoping ramp having channels and rails that couple to the planar surfaces using brackets that engage the longitudinal edges of the ramp members.

It is yet a further object of the present invention to provide a telescoping ramp that is portable, sturdy, lightweight, adjustable and aesthetically pleasing.

It is another object of the present invention to provide a telescoping ramp that can be used to traverse a span of different elevations.

SUMMARY OF THE INVENTION

The present invention relates to a telescoping ramp that comprises two ramp members that fit one atop the other such that the two members are capable of being extended out or collapsed together. The first, outer ramp member has channels on either side of a substantially planar surface. The channels of the outer ramp member are structured to capture the rails on either side of a second ramp member. In one embodiment the first ramp member comprises a substantially planar surface bordered by two longitudinally aligned sides and two substantially lateral sides. An inverted J-shaped channel is formed along each of the longitudinally aligned sides of the first ramp member. In this embodiment, each of the inverted J-shaped channels is dimensionally larger near one of the lateral sides such that the ramp member is structurally stronger at the portion where the two ramp members overlap when the ramp is extended.

The telescoping ramp includes a second ramp member sized to fit atop the first ramp member between the inverted J-shaped channels. Similar to the first ramp member, the second ramp member comprises a substantially planar surface bordered by two longitudinally aligned sides and two substantially lateral sides. The second ramp member includes a protruding rail-like member formed along each of its longitudinally aligned sides. The protruding members are complementarily shaped to slide and fit within a corresponding inverted J-shaped channel of the first ramp member. The second ramp member nests atop and within the longitudinal sides of the first ramp member.

When the telescoping ramp is in an extended position, a portion of each of the rail-like protruding members of the second ramp member engages at least a portion of the dimensionally larger inverted J-shaped channels of the first ramp member. When the telescoping ramp is in a closed position, each of the protruding members of the second ramp member is substantially within a corresponding one of the inverted J-shaped channels of the first ramp member.

The ramp members that makeup the telescoping ramp may be constructed using different techniques. In one embodiment the channels on the first ramp member are made from plastic and include structural supports or gussets for additional structural strengthening.

The telescoping ramps of the present invention may also include a stop member used to prevent the two sliding ramp members from sliding apart. In one embodiment, the stop member is a protruding member on the bottom surface of the second, inner ramp member. The stop member protrudes down from the bottom of the planar surface so that when the two ramp members are extended away from each other, the stop member strikes or abuts a portion of the outer ramp member when the two ramp members reach a fully extended position, thus preventing the two members from separating. In another embodiment, each of the two ramp members includes complementary stop members that are aligned so that they abut when the ramp members reach a predetermined point as the members are slid out. In yet another embodiment, at least one stop member is positioned on the interior of one of the channels and another stop member is placed on an exterior of the corresponding rail-like protrusion such that the two abut when the telescoping ramp is extended.

In the preferred embodiment, the telescoping ramp includes a mounting extension on the first, outer ramp member. The mounting extension is attached to the lateral side of the planar surface that will extend out and adjoins the first, outer ramp member at an obtuse angle relative to the surface of the outer ramp member. The mounting extension may be attached at a predetermined angle to facilitate use of the telescoping ramp between surfaces having different elevations, such as between the ground and the back of an automobile. The mounting extension may be fitted with one or more protrusions, such as non-skid pegs, on its bottom surface to prevent the ramp from slipping off the desired elevated surface.

The telescoping ramp may also include a mounting extension adjoining the second ramp member. The "lower" mounting extension is attached to the planar surface of the inner ramp member at the lateral side closest to the lower elevated surface upon which the ramp will be placed. Similar to the "higher" mounting extension, the lower extension is attached at an obtuse angle relative to an upper side of the planar surface of the second ramp member and may include one or more non-skid protruding members to prevent the ramp from slipping on the lower surface.

The telescoping ramps of the present invention may also include one or more reinforcement or support brackets shaped to surround at least a portion of each of the channels of the outer ramp member. The reinforcement brackets may be placed over the channels at the dimensionally larger portion of each of the inverted J-shaped channels of the first ramp member.

In another embodiment, the telescoping ramp comprises two ramp members that engage by virtue of channel members and rails similar to the embodiment described above. However, in this embodiment, the channels have different structures. The first ramp member comprises a substantially planar member bordered by two longitudinally aligned sides and two substantially lateral sides with the planar member having a top surface, a bottom surface and a predetermined thickness along its longitudinally aligned sides. A channel formed along each of the longitudinally aligned sides of the first ramp member is defined by a sidewall member having an upper end and a lower end. The lower end of the channel member has two substantially perpendicular bracket members attached to the sidewall to define an inverted F-shaped cross section. The gap defined by the two bracket members provides a structure into which the longitudinal edges of the planar member fit. Thus, the channel is coupled to the planar member such that a portion of each longitudinal side of the planar member is bracketed between the bracket members. The upper end of each of the channels extends or protrudes above the top surface of the planar member and ends in a curve that defines an inverted J-shaped cross section. The inverted J-shaped cross-section provides a channel that engages the railing of the second ramp member.

In this embodiment, the second ramp member is constructed similar to the first ramp member. The second ramp member is sized to fit between the channels of the first ramp member. The second ramp member comprises a substantially planar member bordered by two longitudinally aligned sides and two substantially lateral sides with the planar member having a top surface, a bottom surface and a predetermined thickness along its longitudinally aligned sides. A rail is formed along each of the longitudinally aligned sides of the second ramp member, and each rail is defined by a sidewall member having an upper end and a lower end. The lower end includes two substantially perpendicular bracket members attached to the sidewall to define an inverted F-shaped cross section (similar to the inverted F-shape of the fist ramp member). The rail is coupled to the planar member such that a portion of each longitudinal side of the planar member is bracketed between the spaced bracket members. The upper end of each of the rails protrudes above the top surface of the planar member and is complementarily shaped to fit within a corresponding inverted J-shaped channel of the first ramp member.

In this second embodiment, the second ramp member slidingly nests atop and within the longitudinal sides of the first ramp member, similar to the first embodiment. When the telescoping ramp is in an extended position, a portion of each rail of the second ramp member engages at least a portion of a corresponding channel of the first ramp member. When the telescoping ramp is in a closed position, each rail of the second ramp member is substantially within a corresponding channel of the first ramp member.

All embodiments of the telescoping ramp may be constructed of plastic, metal, wood, or a combination of these materials. In one embodiment, the planar parts are constructed of plastic and the channels and rails are constructed from an extruded aluminum alloy.

As with the previous embodiment, this embodiment of the telescoping ramp may also include mounting extensions adjoining the ramp members to facilitate use of the ramp of surfaces having different elevations. The structure and alignment of the mounting extensions are similar to those of the embodiment described above. Similarly, non-skid members may also be added to prevent the ramp from slipping during use.

Another embodiment of the telescoping ramp comprises two ramp members that have a mounting extension built into the first ramp member. The first ramp member comprises a first substantially planar member bordered by two longitudinally aligned sides and two substantially lateral sides. The planar member has a top surface, a bottom surface and a predetermined thickness along its longitudinally aligned sides. The mounting extension is a second substantially planar mounting member bordered by two longitudinally aligned sides and two substantially lateral sides and having a top surface, a bottom surface and a predetermined thickness along its longitudinally aligned sides. The mounting member is attached at one of its lateral sides to the first planar member at one of the lateral sides of the first planar member. As before, the mounting member is adapted to secure one end of the telescoping ramp to an elevated surface during use.

In this embodiment, a channel is formed along each of the longitudinally aligned sides of both the first and second planar members. Each channel is defined by a sidewall member having an upper end and a lower end. The lower end has two substantially perpendicular bracket members attached to the sidewall to define an inverted F-shaped cross section. Each channel is coupled to the first and second planar members such that a portion of each longitudinal side of the first and second planar members is bracketed between the bracket members. Thus, the channel runs along both, the main ramp planar member and the mounting member, providing the mounting member extra structural support. The upper end of each of the channels protrudes above the top surfaces of the first and second planar members. The portion of the channel protruding above the first planar member is curved and defines an inverted J-shaped cross section. In an alternative embodiment, a portion of the upper end of each channel of the first ramp member that protrudes above the top surface of the second "mounting" planar member tapers down to the top surface of the second planar member. This structure provides further strengthening to the junction between the mounting member and the planar member of the first ramp member.

Similar to the embodiment above, this telescoping ramp includes a second ramp member sized to fit between the channels of the first ramp member. The second ramp member comprises a substantially planar member bordered by two longitudinally aligned sides and two substantially lateral sides. The planar member of the second ramp member has a top surface, a bottom surface and a predetermined thickness along the longitudinally aligned sides. A rail is formed along each of the longitudinally aligned sides of the second ramp member. These rails have the same structure as that described above. This embodiment of the telescoping ramp functions like the embodiment described above. Similarly, it may also include a mounting extension for the ramp member designed to be positioned at a lower elevation.

In yet another embodiment of the telescoping ramp of the present invention, the ramp comprises two telescoping ramp members. The first ramp member includes a first substantially planar member bordered by two longitudinally aligned sides and two substantially lateral sides. The first planar member has a top surface with a predetermined thickness along its longitudinally aligned sides. A channel is formed along each of the longitudinally aligned sides of the first planar member and each channel is defined by a substantially vertical sidewall member having an upper end and lower end. The lower end of the sidewall member has at least one substantially perpendicular bracket member attached to one side of the sidewall member. Each of the channels is coupled to the first planar member such that a portion of each longitudinal side of the first planar member is attached to one or more bracket members such that a gap is defined between the longitudinal side of the planar member and the sidewall member. The upper end of each channel protrudes above the top surface of the first planar member and defines an inverted L-shaped cross section.

The alternative embodiment includes a second ramp member sized to fit between the channels of the first ramp member. Similar to the first ramp member, the second ramp member comprises a second substantially planar member bordered by two longitudinally aligned sides and two substantially lateral sides. The second planar member has a top surface and a predetermined thickness along the longitudinally aligned sides. A rail is formed along each of the longitudinally aligned sides of the second ramp member. Each of the rails is defined by a substantially vertical sidewall member having an upper end and a lower end. The lower end has at least one substantially perpendicular bracket member attached to the sidewall member. Each of the rails is coupled to the second planar member such that a portion of each longitudinal side of the second planar member is attached to one or more bracket members. The upper end of each rail protrudes above the top surface of the second planar member and defines an inverted L-shaped cross section and is complementarily shaped to slidingly fit within a corresponding inverted L-shaped channel of the first ramp member.

The second ramp member slidingly nests within the channels of the first ramp member in this alternative telescoping ramp. Similar to the other embodiments, when the telescoping ramp is in an extended position, a portion of each of the rails of the second ramp member engages at least a portion of each of the corresponding channels of the first ramp member. When the telescoping ramp is in a closed position, each of the rails of the second ramp member is substantially within a corresponding one of the channels of the first ramp member.

The alternative telescoping ramp may include many of the additional features described above, including the mounting members and the stop members. In addition, the telescoping ramp may also include a lower extending member extending from the lower end of the sidewall member of each of the rails. The lower extensions are shaped to slidingly fit within the gap defined between the longitudinal side of the first planar member and the sidewall member of each of the channels. One embodiment of the lower extension is shaped to define an L-shaped cross section.

BRIEF DESCRIPTION OF THE DRAWINGS

The subject matter which is regarded as the invention is particularly pointed out and distinctly claimed in the claims at the conclusion of the specification. The foregoing, and other objects, features, and advantages of the present invention are shown and described in the following detailed description of the preferred embodiments which should be viewed in conjunction with the accompanying drawings in which:

DETAILED DESCRIPTION OF THE PREFERRED EMBODIMENTS

The present invention relates to a telescoping ramp 10, and more particularly, a portable, lightweight, adjustable and telescoping ramp used to connect a short span, especially spans of different elevations. It is important to note that the embodiments of the invention described below are only examples of some of the uses of the teachings described herein. In general, statements made in the specification do not limit any of the various claimed inventions. Moreover, some statements may apply to some inventive features but not to others. Unless otherwise indicated, singular elements may be in the plural and vice versa with no loss of generality. Similar reference numerals and letters represent similar components and system features throughout the drawings and the written description.

Figure 8:
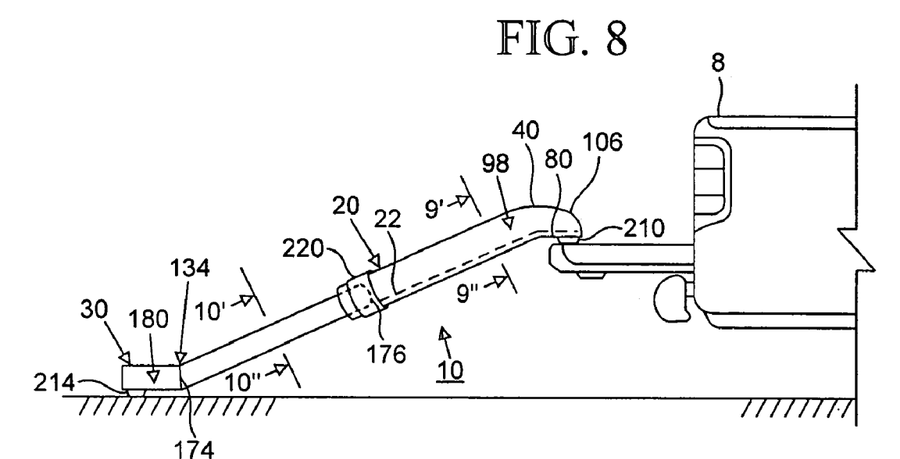
FIG. 8 illustrates the telescoping ramp used between the ground and the back of a vehicle.
Figure 9:
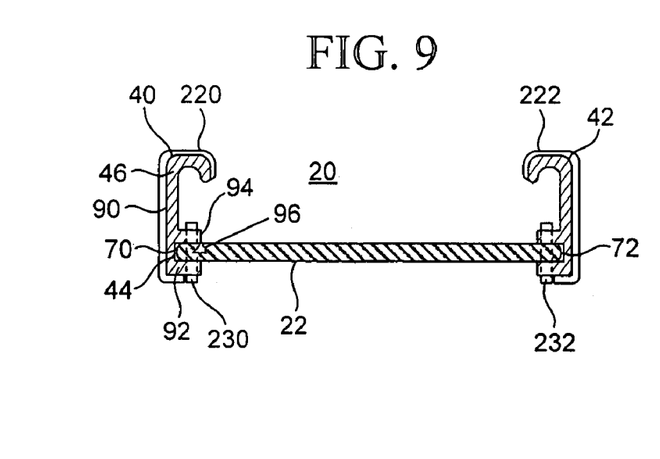
FIG. 9 diagrammatically illustrates a side, cut-away view of the ramp in FIG. 8 from the perspective of line 9'-9"
Figure 10:
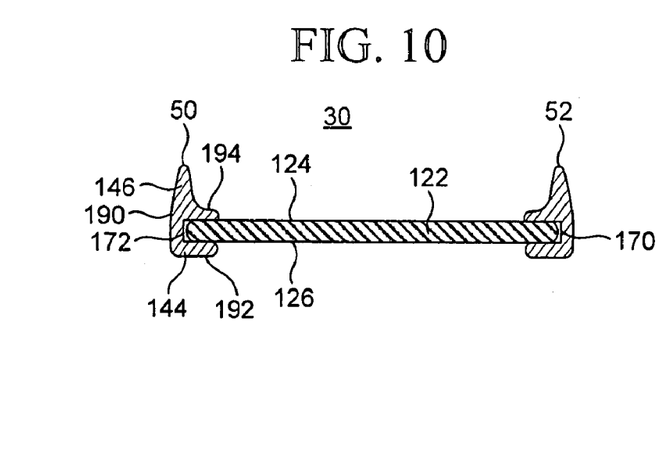
FIG. 10 diagrammatically illustrates a side, cut-away view of the ramp in FIG. 8 from the perspective of line 10'-10"

FIGS. 1 through 7 illustrate one exemplary embodiment of the telescoping ramp 10 of the present invention. FIGS. 8 through 10 illustrate another exemplary embodiment of the telescoping ramp. FIGS. 11 through 14 illustrate further alternative embodiments. These and other embodiments are disclosed herein. The telescoping ramp 10 comprises two ramp members 20, 30 that fit one atop the other such that the two members 20, 30 are capable of being extended out or collapsed together. The first, outer ramp member 20 has channels 40, 42 on either side of a substantially planar surface 28. The channels 40, 42 of the outer ramp member 20 are structured to capture the rails 50, 52 on either side of a second ramp member 30.

Figure 1:
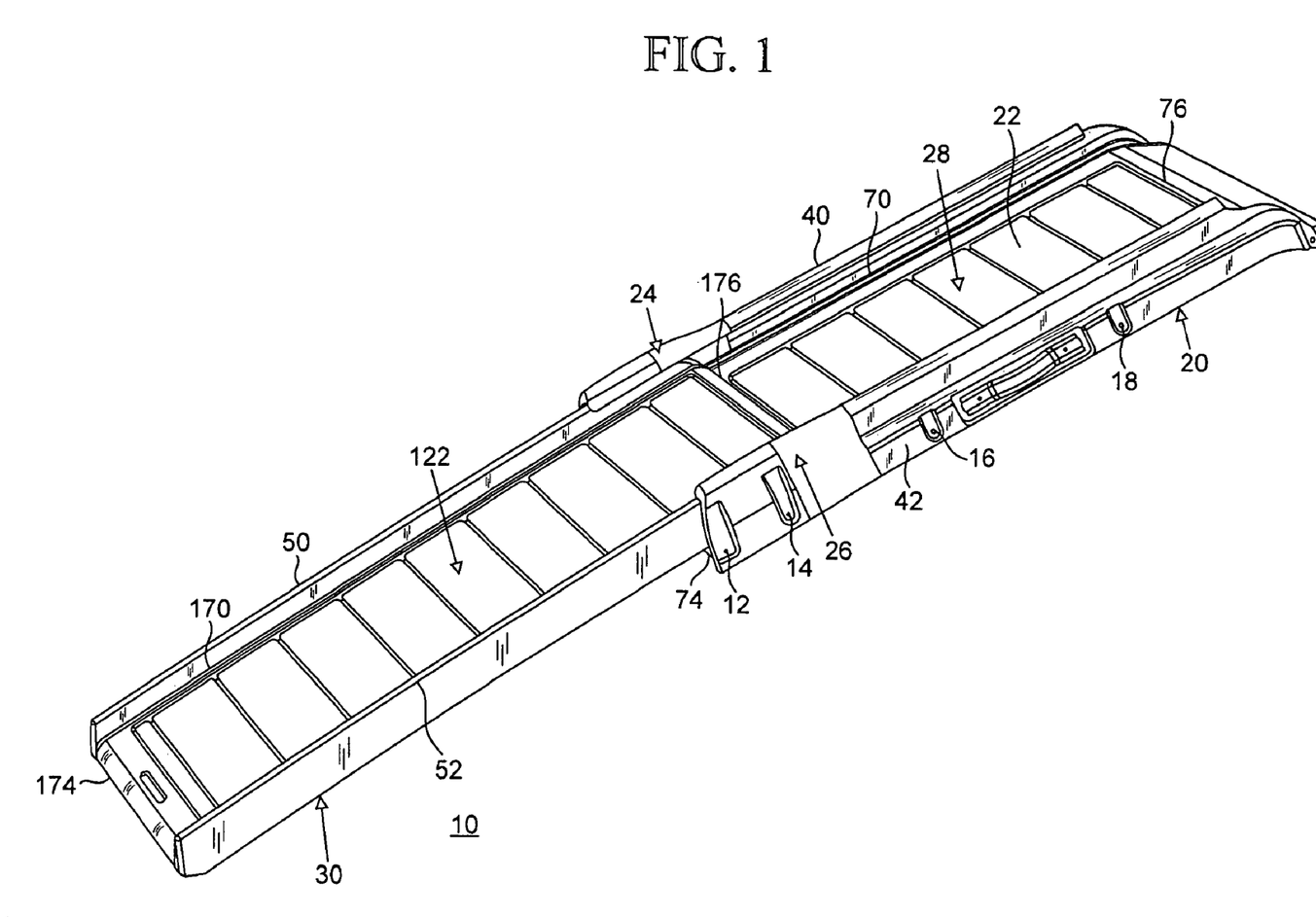
FIG. 1 illustrates an embodiment of the telescoping ramp of the present invention.
Figure 2:
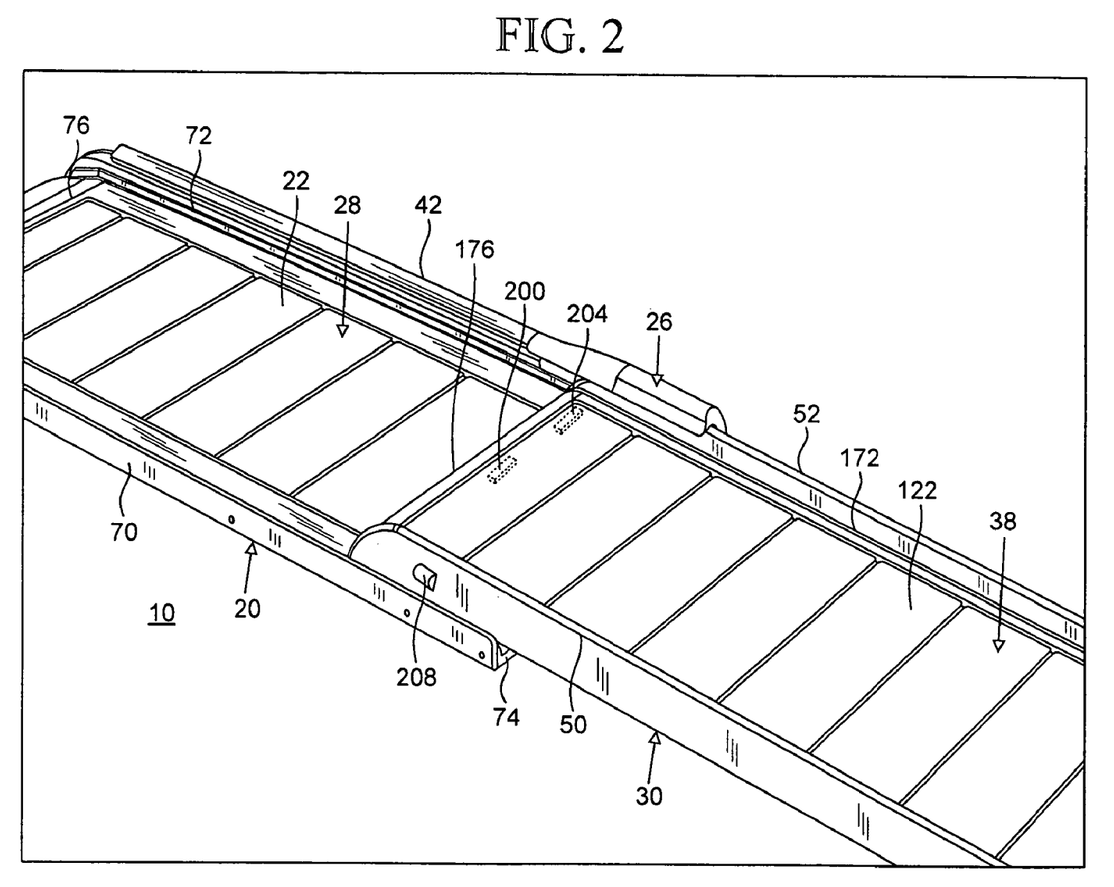
FIG. 2 diagrammatically illustrates a perspective view of part of the telescoping ramp of the present invention in an extended position.

In FIGS. 1 and 2, the first ramp member 20 includes a planar member 22 having a substantially planar surface 28 bordered by two longitudinally aligned sides 70, 72 and two substantially lateral sides 74, 76. In the illustrated embodiment, the planar member 22 has a substantially flat, planar surface 28 on top and has a series of structural supports on its bottom side (see FIGS. 6 and 7). In this embodiment, the planar member 22 may be constructed by injection molding. The mold may include the longitudinally aligned side beams 70, 72 along with the laterally aligned joists 80, 82, 84 and 86. The web-like structure provides added support to distribute the weight of the person, animal or other load being placed atop the ramp during use. Other planar members 22 may be utilized as well. For example, in FIG. 9 planar member 22 is constructed of a solid piece.

Figure 4:
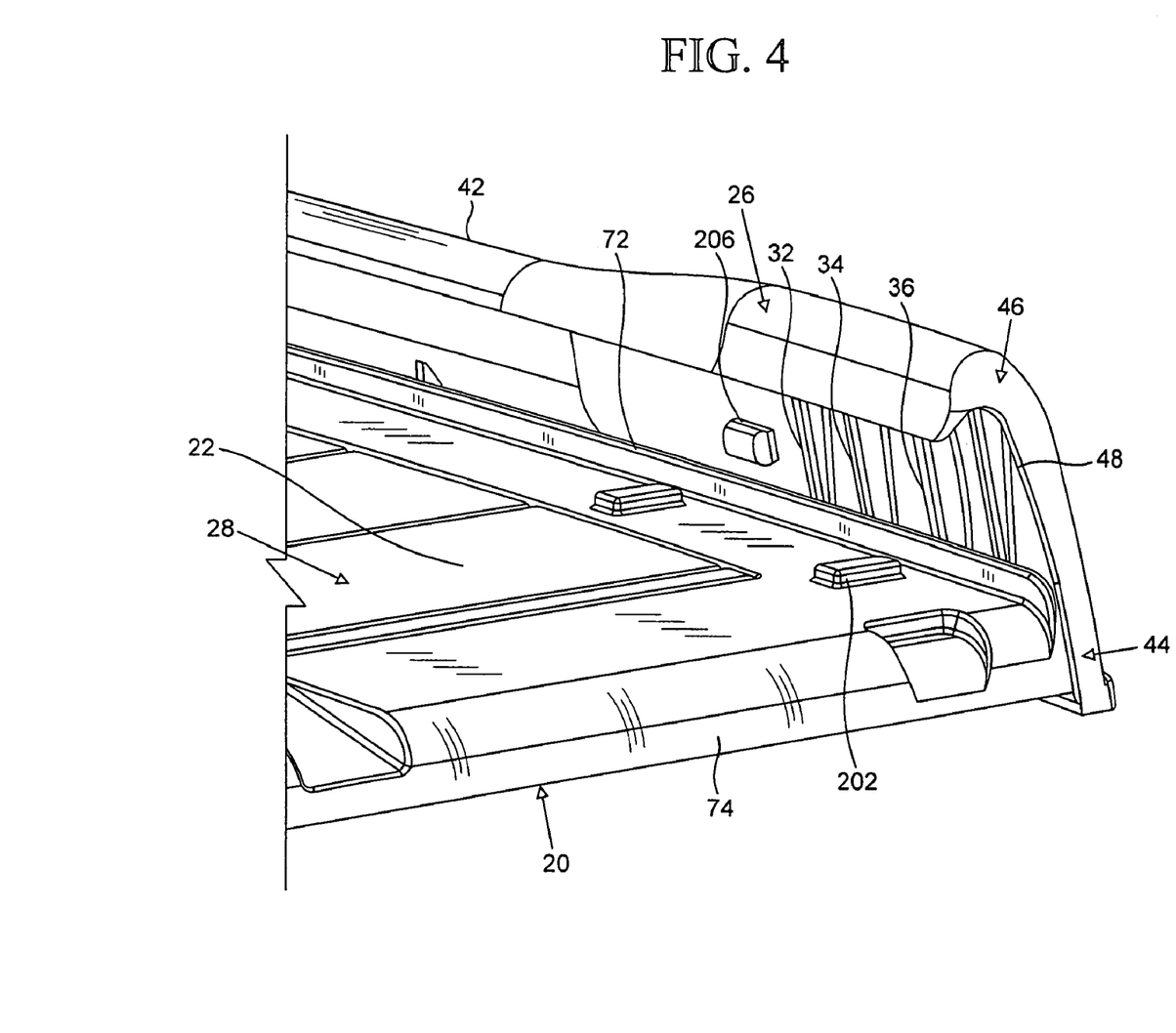
FIG. 4 diagrammatically illustrates a perspective view of one ramp member of the telescoping ramp of the present invention.
Figure 6:
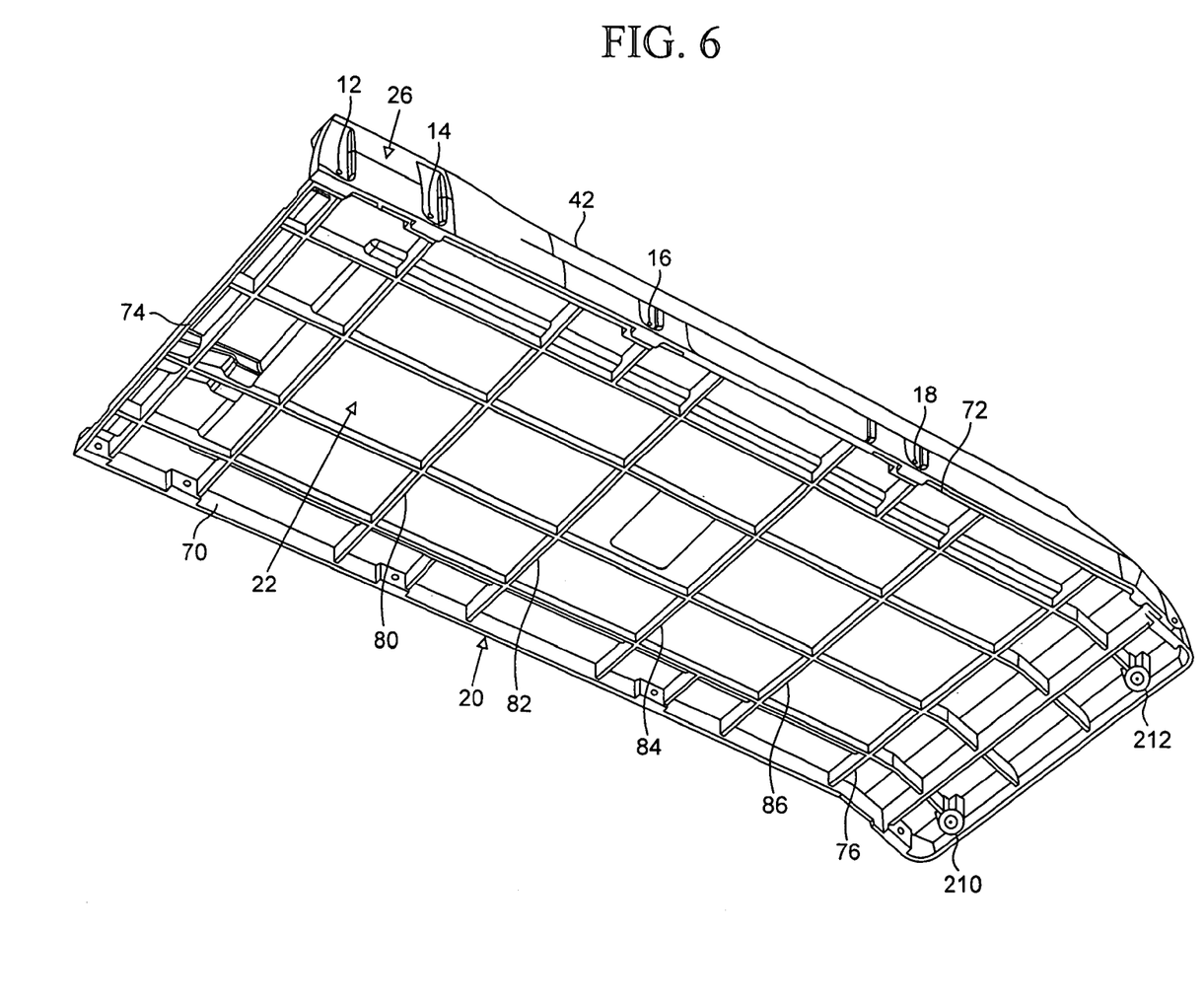
FIG. 6 shows a bottom view of one ramp member of the telescoping ramp of the present invention.
Figure 7:
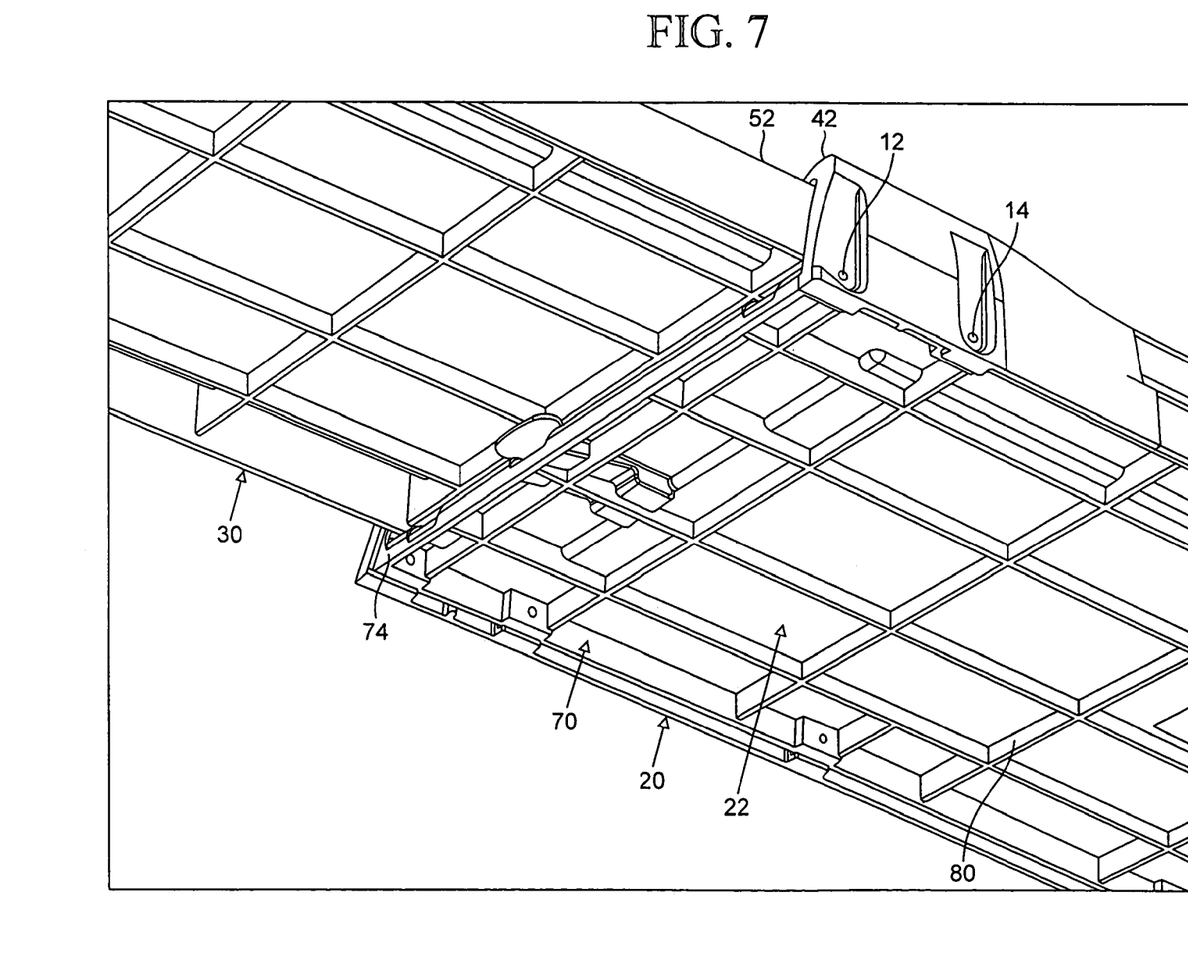
FIG. 7 diagrammatically illustrates a partial, bottom view of the junction between two ramp members of the telescoping ramp.

On either side of ramp member 20 are two channels 40, 42. FIG. 4 illustrates channel 42. The channels 40, 42 are formed along each of the longitudinally aligned sides of the first ramp member 20. In FIG. 4, the lower end 44 of the channel 42 abuts the longitudinal side 72 of ramp member 20. Channel 42 is fastened to the planar member 22 by screws at indentations 12, 14, 16 and 18 (FIG. 6). Other fastening means may be utilized as is known to those skilled in the art. The upper end 46 of channel 42 is curved and defines an inverted J-shaped channel. This candy cane or sheperd's cane shape is formed along each of the longitudinally aligned sides 70, 72 of the first ramp member 20. In this embodiment, each of the inverted J-shaped channels 40, 42 is dimensionally larger at the portion 24, 26 near the lateral side 74 that will experience the greatest force when the ramp 10 is in an extended position. In FIG. 4, the upper portion 46 of channel 42 is structurally stronger at the portion where the two ramp members overlap when the ramp is extended. The shape and dimensions of the inner part 48 of the inverted J-shaped channel remain substantially constant throughout the length of channel 42, but the dimensions of the outer structure are larger to provide added structural support. In the embodiment illustrated in FIG. 4, gussets 32, 34, and 36 strengthen the walls of the channel.

In FIGS. 5 and 8 through 10, the first, outer ramp member 20 includes two planar members 22, 80. The second planar member 80 is a mounting extension used to secure the ramp on an elevated surface. FIG. 8 illustrates the ramp 10 being used to bridge the span between the ground and the back of a pickup truck 8. Similar to planar member 22, the mounting extension or mounting member 80 includes two longitudinal sides 182, 184 and two substantially lateral sides 86, 88 (see FIG. 5). The mounting extension 80 in FIG. 5 includes decorative paw prints shown on an upper surface 102. Mounting extension 80 is adjoined to planar member 22 at lateral sides 88 and 76, respectively. Mounting extension 80 may constructed separately and attached to planar member 22 or may be an extension of planar member 22 that is bent to produce the obtuse angle between the two surfaces. In the embodiments illustrated in FIGS. 5 and 8, channels 40, 42 extend along each of the longitudinally aligned sides of both the first planar member 22 and the second planar mounting extension 80 providing additional structural support to the mounting extension 80. The mounting extension 80 may be fitted with one or more protrusions, such as non-skid pegs 210, 212 (FIG. 6), on its bottom surface to prevent the ramp 10 from slipping off the desired elevated surface.

In the embodiment illustrated in FIGS. 8 through 10, the channels 40, 42 have substantially similar dimensions throughout. Each channel 40, 42 is defined by a sidewall member 90 having an upper end 46 and a lower end 44. The lower end 44 has two substantially perpendicular bracket members 92, 94 attached to the sidewall to define an inverted F-shaped cross section. Each channel 40, 42 is coupled to the first and second planar members such that a portion 96 of each longitudinal side of the first and second planar members 22, 80 is bracketed between the bracket members 92, 94. The inverted F-shaped brackets may be fastened to the ramp planar members via screws or bolts 230, 232 running through the bracket members 92, 94 as shown in FIG. 9. However, the channels 40, 42 may also be attached to the planar members using other mechanical means known to those skilled in the art. For example, the planar members can be constructed with raised edges that snap into small channels formed on the inside of the inverted F-shaped brackets. In another embodiment, the top perpendicular bracket member 94 is omitted and the planar members 22, 80 are fastened to the lower bracket member 92. See FIG. 11. Alternatively, only the top bracket may be included with the fastening means 230 holding the planar member 22 to the bracket member 94.

The telescoping ramps 10 of the present invention may also include one or more reinforcement or support brackets 220, 222 shaped to surround at least a portion of each of the channels 40, 42 of the outer ramp member 20 (FIGS. 8 and 9). The reinforcement brackets 220, 222 may also be placed over the channels 40, 42 at the dimensionally larger portion of each of the inverted J-shaped channels of the first ramp member.

Figure 5:
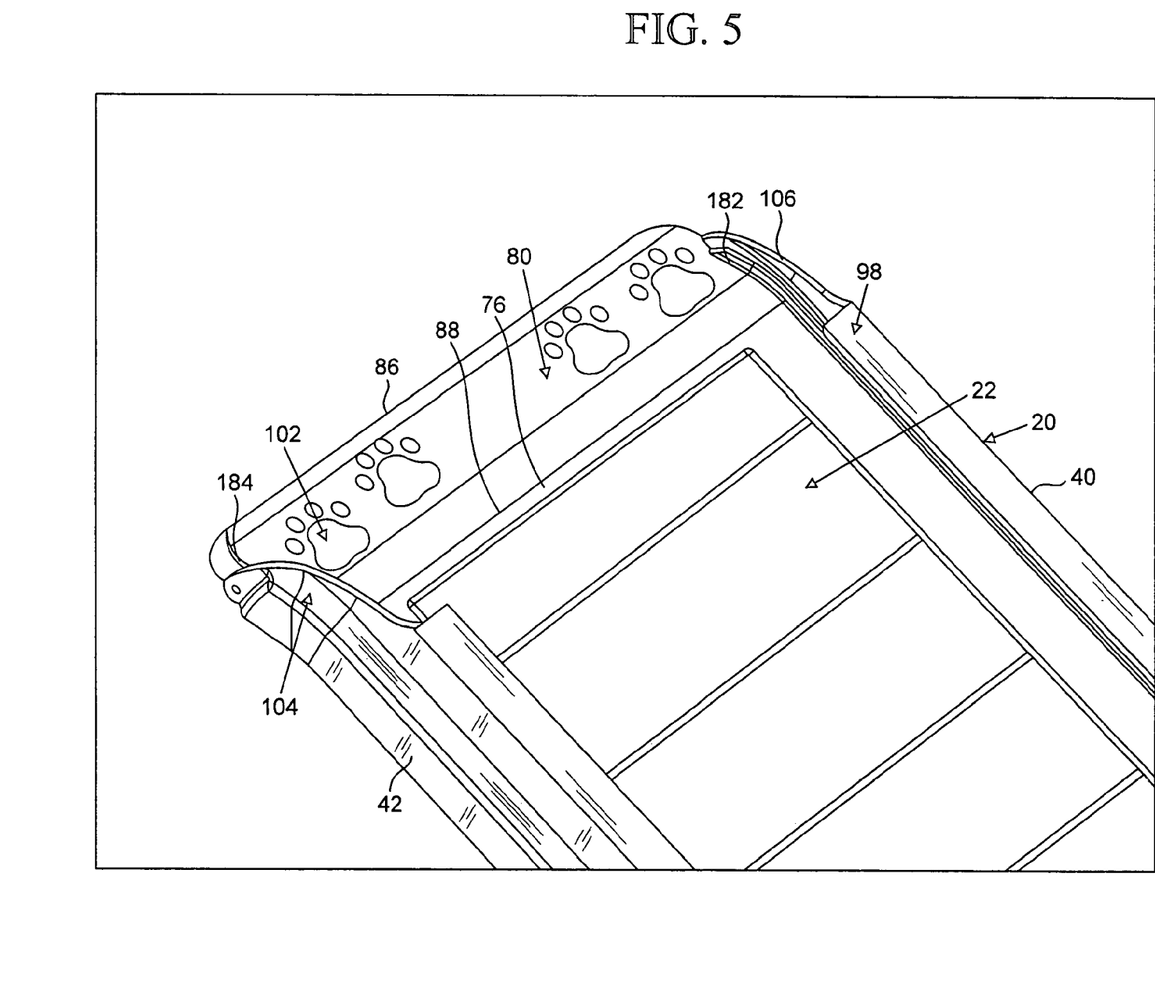
FIG. 5 diagrammatically illustrates one end of one ramp member of the telescoping ramp of the present invention.

The channel 40 runs along both, the main ramp planar member 22 and the mounting member or extension 80, providing the mounting member 80 extra structural support (FIGS. 5 and 8). The upper end 46 of each of the channels 40, 42 protrudes above the top surfaces of the first and second planar members 22, 80 (FIGS. 4 and 5). The portion 98 of channel 40 protruding above the first planar member 22 is curved and defines an inverted J-shaped cross section. In the embodiment illustrated in FIG. 5, a portion of the upper end 106 of each channel 40 of the first ramp member 20 that protrudes above the top surface 102 of the second "mounting" planar member 80 tapers down to the top surface 102 of the second planar member. The tapered shape can be implemented by cutting channel member 40. Alternatively, channel 40 can be mitered to conform to the angle formed by the planar members 22, 80. For example, in FIG. 8, the lower mounting extension 180 includes a mitered junction 134. In FIG. 5, the curved portion 104, 106 provides additional structural support to mounting extension 80, by further strengthening the junction between the mounting member 80 and the planar member 22 of the first ramp member 20.

The telescoping ramp 10 includes a second ramp member 30 sized to fit atop the first ramp member 20 between the inverted J-shaped channels 40, 42. Similar to the first ramp member, the second ramp member 30 comprises a substantially planar member 122 having a planar top surface 38 bordered by two longitudinally aligned sides 170, 172 and two substantially lateral sides 174, 176. The second ramp member 30 includes a protruding rail-like member 50, 52 formed along each of its longitudinally aligned sides 170, 172. In the embodiment illustrated in FIGS. 1 through 10, the rail members 50, 52 protrude in a substantially vertical manner and are complementarily shaped to slide and fit within a corresponding inverted J-shaped channel 40, 42 of the first ramp member 20. The second ramp member 30 nests atop and within the longitudinal sides 70, 72 of the first ramp member 20.

The construction of the second ramp member 30 is similar to the first ramp member 20. In one embodiment illustrated in FIGS. 1 through 7, the rails 50, 52 are attached or affixed to the sides of the planar member 122. In another embodiment illustrated in FIGS. 8 through 10, the rails 50, 52 are attached using an inverted F-shaped bracket similar to the bracket described in connection with ramp member 20. FIG. 10 diagrammatically illustrates a cutaway view of the embodiment illustrated in FIG. 8 from the perspective of 10'-10". In this embodiment, the second ramp member 30 is sized to fit between the channels 40, 42 of the first ramp member 20. The second ramp member 30 comprises a substantially planar member 122 bordered by two longitudinally aligned sides 170, 172, with the planar member 122 having a top surface 124, a bottom surface 126 and a predetermined thickness along its longitudinally aligned sides 170, 172. Although illustrated as having a constant thickness in FIG. 8, the planar member 122 may vary in thickness. For example, the edges attached to the rails may have a greater thickness to increase the strength of the junction between the two components. Alternatively, the planar member may be a laminate material having less thickness at the edges to accommodate the attachment to the rails 50, 52. As illustrated, each rail 50, 52 is defined by a sidewall member 190 having an upper end 146 and a lower end 144. The lower end 144 includes two substantially perpendicular bracket members 192, 194 attached to the sidewall 190 to define an inverted F-shaped cross section (similar to the inverted F-shape of the first ramp member 20). The rails 50, 52 are coupled to the planar member 122 such that a portion of each longitudinal side 170, 172 of the planar member 122 is bracketed between the spaced bracket members 192, 194, in much the same manner as described in connection with ramp member 20. The upper end 146 of each of the rails 50, 52 protrudes above the top surface 124 of the planar member 122 and is complementarily shaped to fit within a corresponding inverted J-shaped channel 40, 42 of the first ramp member 20.

The second ramp member 30 of the telescoping ramp 10 may also include a mounting extension 180 adjoining the second ramp member 30 (FIG. 8). The "lower" mounting extension 180 is attached to the planar member 122 of the inner ramp member 30 at the lateral side 174 closest to the lower elevated surface upon which the ramp will be placed (see FIG. 8). Similar to the "higher" mounting extension 80, the lower extension 180 is attached at an obtuse angle relative to an upper surface or top side of planar member 122 of the second ramp member 30 and may include one or more non-skid protruding members 214 to prevent the ramp 10 from slipping on the lower surface.

Figure 3:
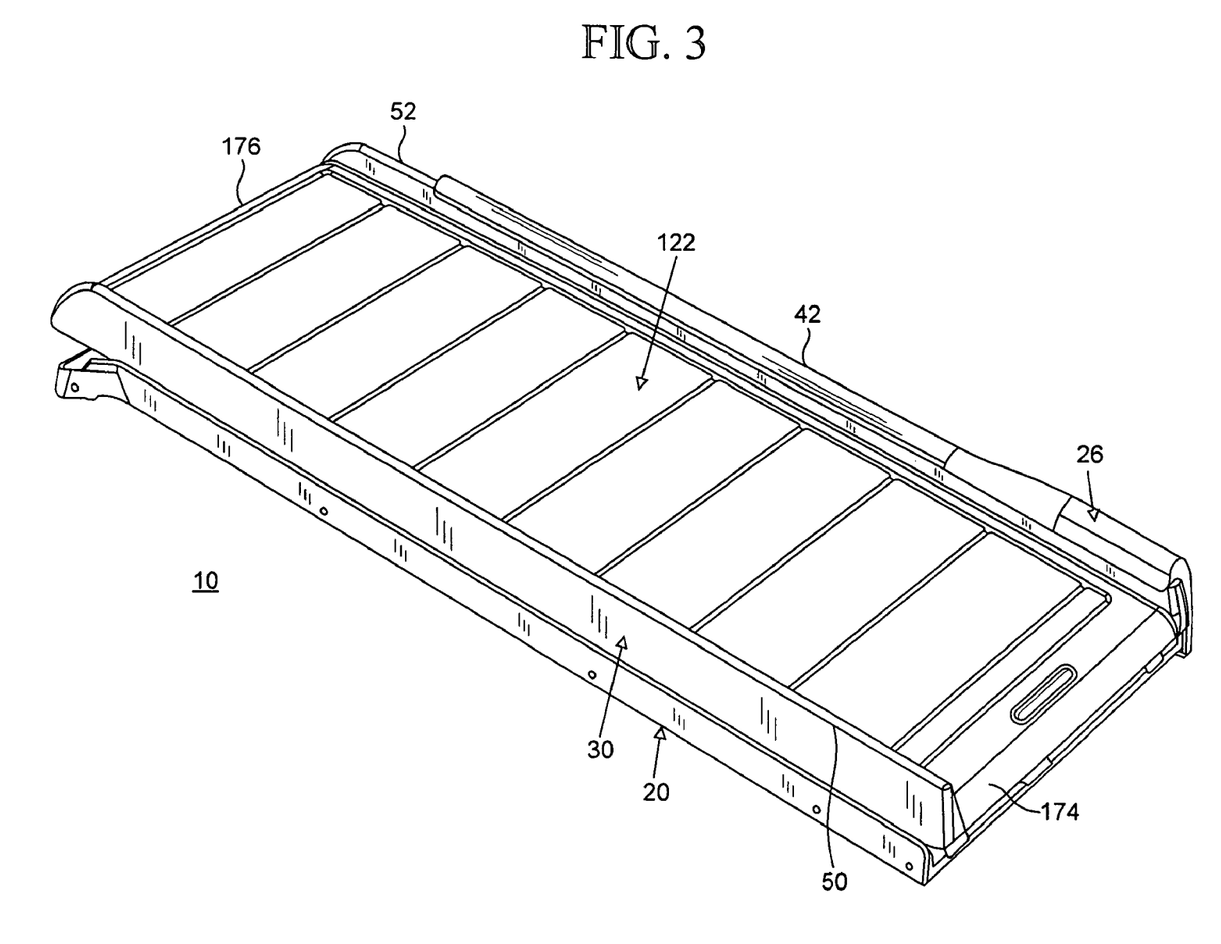
FIG. 3 diagrammatically illustrates a perspective view of part of the telescoping ramp of the present invention in a closed position.

The telescoping ramp 10 may be slid to an extended position as illustrated in FIGS. 1, 2 and 8, or may be slid into a closed position as illustrated in FIG. 3. When the telescoping ramp 10 is in an extended position, a portion of each of the rail-like protruding members 50, 52 of the second ramp member 30 engages at least a portion of the dimensionally larger inverted J-shaped channels 40, 42 of the first ramp member 20 (see FIG. 2). When the telescoping ramp 10 is in a closed position, each of the protruding members 50, 52 of the second ramp member 30 is substantially within a corresponding one of the inverted J-shaped channels 40, 42 of the first ramp member 20 (see FIG. 3).

The telescoping ramps 10 of the present invention may also include one or more stop members 200, 202, 204, 206, 208 used to prevent the two sliding ramp members 20, 30 from sliding completely apart. In one embodiment, the stop member 200 is a protruding member on the bottom surface of the second, inner ramp member 30 (see FIG. 2). The stop member 200 protrudes down from the bottom of the planar member 122 so that when the two ramp members 20, 30 are extended out, away from each other, the stop member 200 strikes or abuts a portion of the outer ramp member 20 when the two ramp members reach a fully extended position, thus preventing the two members 20, 30 from separating. In another embodiment, each of the two ramp members includes complementary stop members 202, 204 that are aligned so that they abut when the ramp members 20, 30 reach a predetermined point as the members are slid out (see stop member 202 in FIG. 4 and complementary stop member 204 in FIG. 2). In yet another embodiment, at least one stop member 206 is positioned on the interior 48 of one of the channels 40, 42 and another stop member 208 (FIG. 4) is placed on the exterior of the corresponding rail-like protrusion 50, 52 (shown on opposite side for illustration in FIG. 2) such that the two abut when the telescoping ramp 10 is extended.

Figure 11:
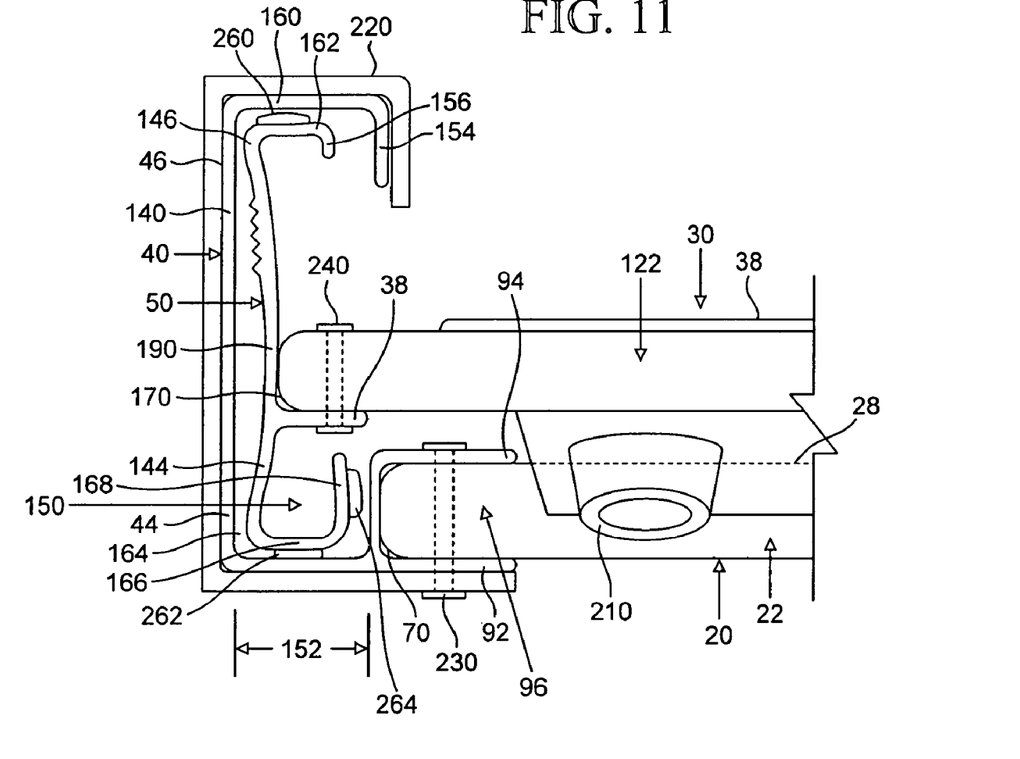
FIG. 11 is a partial side, cut-away view of an alternative embodiment of the telescoping ramp.
Figure 12:
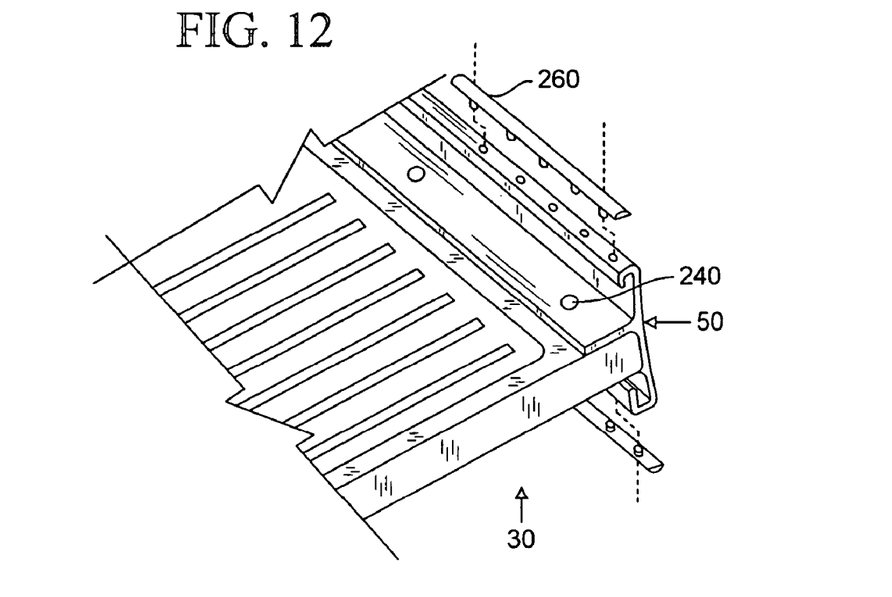
FIG. 12 illustrates a partial, perspective view of one ramp member.
Figure 13:
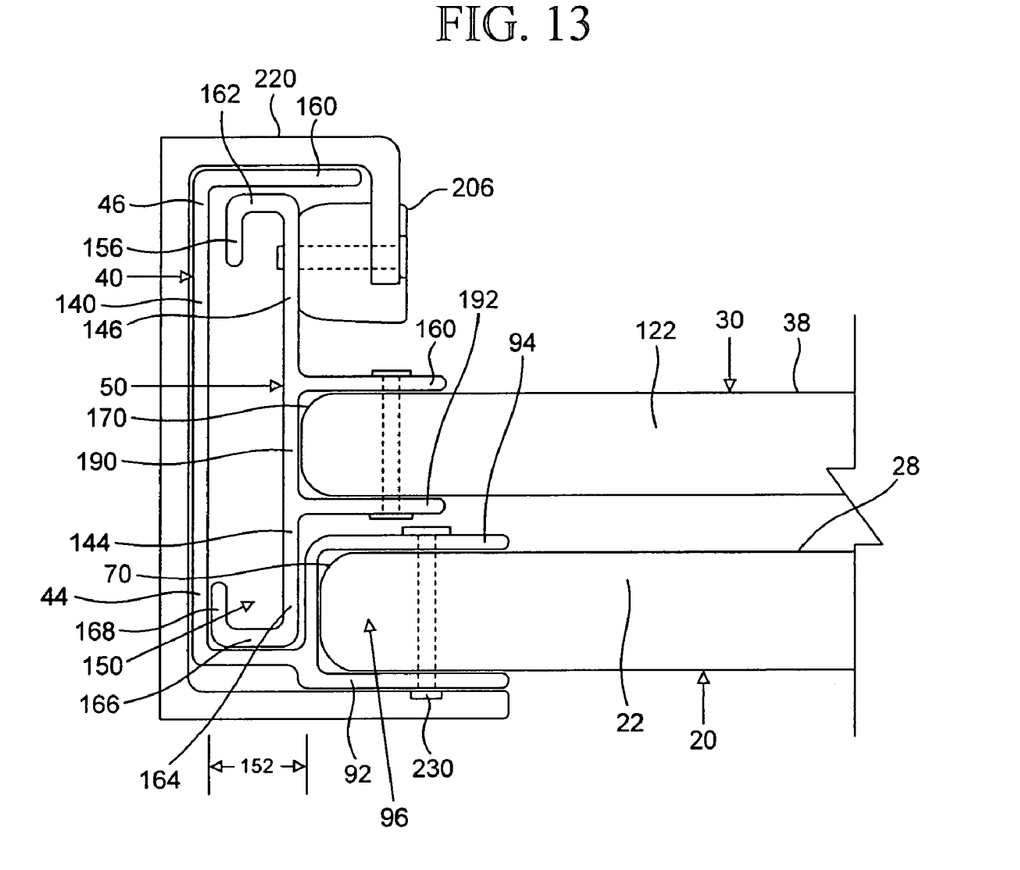
FIG. 13 is a partial side, cut-away view of another embodiment of the telescoping ramp.

FIG. 11 through FIG. 14 illustrate alternative embodiments of the structures that define the channels 40 and rails 50 of the telescoping ramp 10. The telescoping ramp 10 comprises a first ramp member 20. Similar to the other embodiments, first ramp member 20 includes a first substantially planar member 22 bordered by two longitudinally aligned sides 70 and two substantially lateral sides. The planar member 22 has a top surface 38 and a predetermined thickness along the longitudinally aligned sides. A channel 40 is formed along each of the longitudinally aligned sides of the first planar member 22. Each channel 40 is defined by a substantially vertical sidewall member 140 having an upper end 46 and a lower end 44. The lower end 44 has at least one substantially perpendicular bracket member 92 attached to one side of the sidewall member 140. In FIGS. 11 and 13, sidewall member 140 has two bracket members 92, 94. Each channel 40 is coupled to the first planar member 22 such that a portion of each longitudinal side 70 of the first planar member 22 is attached to the bracket members 92, 94 such that a gap 150 is defined between the longitudinal side 70 and the sidewall member 140. The gap 150 has a width illustrated by dimensional arrow 152. The upper end 46 of each the channels 40 protrudes above the top surface 28 of the first planar member 22 and defines an inverted L-shaped cross section. The inverted L-shaped cross section is formed by the substantially perpendicular member 160 and sidewall member 140. The embodiment illustrated in FIG. 11 includes an additional downward member 154.

Figure 14:
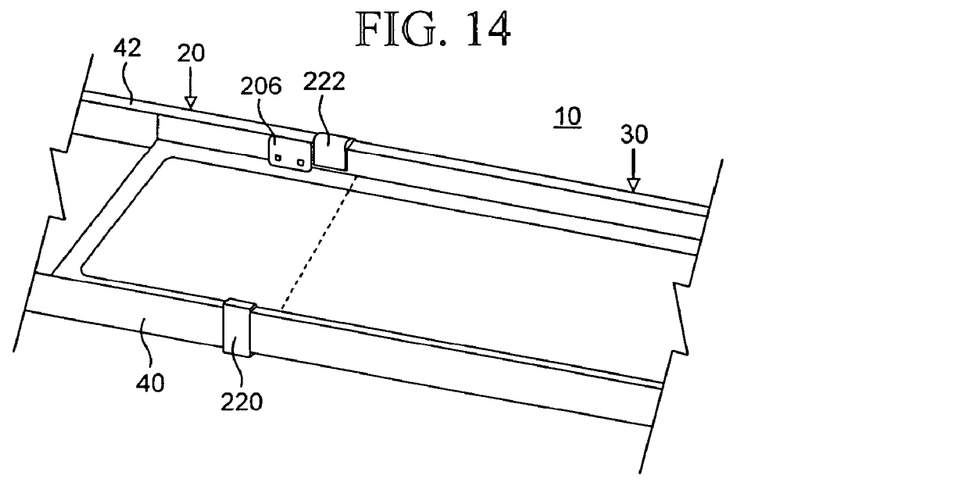
FIG. 14 illustrates a partial, perspective view of the ramp members.

The ramp 10 of FIGS. 11 through 14 include a second ramp member 30 sized to fit between the channels 40, 42 of the first ramp member 20 (see FIG. 14). The second ramp member 30 also includes a second substantially planar member 122 bordered by two longitudinally aligned sides 170 and two substantially lateral sides. The second planar member 122 has a top surface 38 and a predetermined thickness along each of the longitudinally aligned sides. A rail 50 is formed along each of the longitudinally aligned sides 170 of the second ramp member 30. Each of the rails 50 is defined by a substantially vertical sidewall member 190 having an upper end 146 and a lower end 144. The lower end 144 has at least one substantially perpendicular bracket member 192 attached to the sidewall member 190. In FIG. 11, only one bracket member 192 is illustrated. FIG. 13 illustrates an embodiment having two substantially perpendicular bracket members 192, 194. Each of the rails is coupled to the second planar member 122 such that a portion of each longitudinal side 170 of the second planar member 122 is attached to at least one bracket member 192, 194. In FIGS. 11 and 13, the bracket members are attached using a bolt 240. The upper end 146 of each rail 50 protrudes above the top surface 38 of the second planar member 122 and defines an inverted L-shaped cross section. The inverted L-shaped cross section is formed by the substantially perpendicular member 162 and sidewall member 170. The embodiments illustrated in FIGS. 11 and 13 includes an additional downward member 156. The rail 50 is complementarily shaped to slidingly fit within a corresponding inverted L-shaped channel 40 of the first ramp member 20.

In FIGS. 11 and 13, the lower end 144 of said sidewall member 190 of each rail 50 includes an additional lower extension 164 shaped to slidingly fit within the gap 150 between the longitudinal side 70 of the first planar member 22 and the sidewall member 140 of each channel 40. The lower extension 164 of each the rails 50 defines an L-shaped cross section. The L-shaped cross section is made up of the downward protruding sidewall member 190 and the substantially perpendicular lower member 166. In FIGS. 11 and 13, the lower extension 164 includes an additional upward member 168. In order to reduce friction between the rails 50 and channels 40, glides 260, 262, 264 may be added to the surfaces coming in contact with each other during sliding of the two ramp members 20, 30. The glides may be made of materials having very low coefficient of friction, such as TEFLON®. FIG. 12 illustrates one embodiment in which the glide 260 is attached to the rail 50 in strips. The glides 260, 262 may also be smaller in size and interspersed throughout the rail 50 or channel 40.

FIG. 13 includes a stop member 206 attached to the upper portion 146 of the sidewall member 190 of rail 50. The stop member is shaped and sized to abut channel reinforcement bracket 220 when the ramp 10 is in a fully extended position. See FIG. 14. The purpose of stop member 206 is to prevent the ramp members 20, 30 from separating when the ramp 10 is fully extended.

The ramp members and components that makeup the telescoping ramp 10 may be constructed using different techniques. In one embodiment the channels 40, 42 on the first ramp member 20 are made from plastic and include structural supports or gussets 32, 34, 36 (FIG. 4) for additional structural strengthening. In another embodiment, the channels 40, 42 and rails 50, 52 are constructed using an extrusion process (FIGS. 11 through 14). For example, an extruded aluminum alloy provides excellent strength and load bearing capability, but is also light weight, making it easier to carry the telescoping ramp 10. The telescoping ramp 10 may be made of different materials, including plastic, metal, wood or a combination of these materials.

The claims appended hereto are meant to cover modifications and changes within scope and spirit of the present invention.

What is claimed is:

1. A telescoping ramp comprising:
    a first ramp member comprising
        a substantially planar surface bordered by two longitudinally aligned sides and two substantially lateral sides;
        an inverted J-shaped channel formed along each of said longitudinally aligned sides of said first ramp member, each said inverted J-shaped channel being dimensionally larger near one of said lateral sides;
    a second ramp member sized to fit atop said first ramp member between said inverted J-shaped channels, said second ramp member comprising
        a substantially planar surface bordered by two longitudinally aligned sides and two substantially lateral sides;
        a protruding member formed along each of said longitudinally aligned sides, each said protruding member complementarily shaped to slidingly fit within a corresponding inverted J-shaped channel of said first ramp member;
    wherein said second ramp member slidingly nests atop and within said longitudinal sides of said first ramp member;
    wherein when the telescoping ramp is in an extended position, a portion of each said protruding member of said second ramp member engages at least a portion of said dimensionally larger inverted J-shaped channel of said first ramp member, and
    wherein when the telescoping ramp is in a closed position, each said protruding member of said second ramp member is substantially within a corresponding one of each said inverted J-shaped channel of said first ramp member.

2. A telescoping ramp as claimed in claim 1 wherein each said inverted J-shaped channel includes at least one gusset formed within an interior space at said dimensionally larger portion of said inverted J-shaped channel.

3. A telescoping ramp as claimed in claim 1 wherein said second ramp member includes a stop member on a bottom surface of said planar surface, said stop member adapted to prevent said second ramp member from separating from said first ramp member when the telescoping ramp is in said extended position.

4. A telescoping ramp as claimed in claim 1 wherein said first ramp member includes a first stop member near said dimensionally larger portion of said inverted J-shaped channel and said second ramp member includes a corresponding second stop member protruding outward of said longitudinal side of said second member positioned such that upon the telescoping ramp being extended said first and second stop members abut, preventing said first and second ramp members from separating.

5. A telescoping ramp as claimed in claim 1 wherein said first ramp member includes a first stop member on a top portion of said planar surface near said lateral side having said dimensionally larger inverted J-shaped channel;
    wherein said second ramp member includes a corresponding second stop member on a bottom portion of said planar surface of said second ramp member,
    said first and second stop members being longitudinally aligned such that upon the telescoping ramp being extended said first and second stop members abut, preventing said first and second ramp members from separating.

6. A telescoping ramp as claimed in claim 1 wherein said first ramp member includes a mounting extension attached to said planar surface at said lateral side opposite said lateral side having said dimensionally larger inverted J-shaped channel, said mounting extension adapted to secure the telescoping ramp to an elevated surface during use.

7. A telescoping ramp as claimed in claim 6 wherein said mounting extension is attached at an obtuse angle relative to a bottom side of said planar surface of said first ramp member.

8. A telescoping ramp as claimed in claim 7 wherein a bottom side of said mounting extension includes at least one non-skid protrusion.

9. A telescoping ramp as claimed in claim 1 wherein said second ramp member includes a mounting extension attached to said planar surface at said lateral side farthest from said first ramp member in said extended position, said mounting extension adapted to secure the telescoping ramp to a surface during use.

10. A telescoping ramp as claimed in claim 9 wherein said mounting extension is attached at an obtuse angle relative to an upper side of said planar surface of said second ramp member.

11. A telescoping ramp as claimed in claim 10 wherein a bottom side of said mounting extension attached to said second ramp member includes at least one non-skid protrusion.

12. A telescoping ramp as claimed in claim 1 further comprising a reinforcement bracket shaped to surround at least a portion of each said dimensionally larger portion of each said inverted J-shaped channel of said first ramp member.

13. A telescoping ramp comprising:
a first ramp member comprising
a first substantially planar member bordered by two longitudinally aligned sides and two substantially lateral sides, said first planar member having a top surface and a predetermined thickness along said longitudinally aligned sides;
a channel formed along each of said longitudinally aligned sides of said first ramp member, each said channel defined by a sidewall member having an upper end and a lower end, said lower end having at least one substantially perpendicular bracket member attached to said sidewall member to define an L-shaped cross section, each said channel coupled to said first planar member such that a portion of each longitudinal side of said first planar member is attached to said at least one bracket member, and said upper end of each said channel protrudes above said top surface of said first planar member and curves to define an inverted J-shaped cross section;
a second ramp member sized to fit between said channels of said first ramp member, said second ramp member comprising
a second substantially planar member bordered by two longitudinally aligned sides and two substantially lateral sides, said second planar member having a top surface and a predetermined thickness along said longitudinally aligned sides;
a rail formed along each of said longitudinally aligned sides of said second ramp member, each said rail defined by a sidewall member having an upper end and a lower end, said lower end having at least one substantially perpendicular bracket member attached to said sidewall member to define an L-shaped cross section, said rail coupled to said second planar member such that a portion of each longitudinal side of said second planar member is attached to said at least one bracket member, and said upper end of each said rail protrudes above said top surface of said second planar member and is complementarily shaped to slidingly fit within a corresponding inverted J-shaped channel of said first ramp member;
wherein said second ramp member slidingly nests atop and within said longitudinal sides of said first ramp member;
wherein when the telescoping ramp is in an extended position, a portion of each said rail of said second ramp member engages at least a portion of a corresponding said channel of said first ramp member, and
wherein when the telescoping ramp is in a closed position, each said rail of said second ramp member is substantially within a corresponding one of each said channel of said first ramp member.

14. A telescoping ramp as claimed in claim 13 wherein said sidewall member of each said channel includes two substantially perpendicular bracket members attached to said sidewall member to define an inverted F-shaped cross section and each said channel is coupled to said first planar member such that a portion of each longitudinal side of said first planar member is bracketed between said bracket members.

15. A telescoping ramp as claimed in claim 13 wherein said sidewall member of each said rail includes two substantially perpendicular bracket members attached to said sidewall member to define an inverted F-shaped cross section and each said rail is coupled to said second planar member such that a portion of each longitudinal side of said second planar member is bracketed between said bracket members.

16. A telescoping ramp as claimed in claim 14 wherein said sidewall member of each said rail includes two substantially perpendicular bracket members attached to said sidewall member to define an inverted F-shaped cross section and each said rail is coupled to said second planar member such that a portion of each longitudinal side of said second planar member is bracketed between said bracket members.

17. A telescoping ramp as claimed in claim 13 wherein each said channel of said first ramp member and each said rail of said second ramp member is made of a material from the group consisting of a plastic and an aluminum alloy.

18. A telescoping ramp as claimed in claim 13 wherein said second ramp member includes a stop member on said bottom surface of said planar member, said stop member adapted to prevent said second ramp member from separating from said first ramp member when the telescoping ramp is in said extended position.

19. A telescoping ramp as claimed in claim 13 wherein said first ramp member includes a channel stop member coupled to said sidewall member of one of said channels between said upper end and said lower end.

20. A telescoping ramp as claimed in claim 19 wherein said second ramp member includes a corresponding rail stop member coupled to and protruding outward of one of said rails positioned such that upon the telescoping ramp being extended said channel and rail stop members abut, preventing said first and second ramp members from separating.

21. A telescoping ramp as claimed in claim 13 wherein said first ramp member includes a mounting extension attached to said first planar member at one of said lateral sides, said mounting extension adapted to secure the telescoping ramp to an elevated surface during use.

22. A telescoping ramp as claimed in claim 21 wherein said mounting extension is attached at an obtuse angle relative to a bottom surface of said first planar member of said first ramp member.

23. A telescoping ramp as claimed in claim 22 wherein a bottom side of said mounting extension includes at least one non-skid protrusion.

24. A telescoping ramp as claimed in claim 13 wherein said second ramp member includes a mounting extension attached to said second planar member, said mounting extension adapted to secure the telescoping ramp to a surface during use.

25. A telescoping ramp as claimed in claim 24 wherein said mounting extension is attached at an obtuse angle relative to said top surface of said second planar member of said second ramp member.

26. A telescoping ramp as claimed in claim 13 further comprising at least one reinforcement bracket shaped to surround a portion of each said channel on said first ramp member, said reinforcement bracket extending from said upper end to said lower end, and said bracket being positioned along said channel so as to strengthen said channel when the telescoping ramp is in said extended position.

27. A telescoping ramp comprising:
a first ramp member comprising
  a first substantially planar member bordered by two longitudinally aligned sides and two substantially lateral sides, said planar member having a top surface and a predetermined thickness along said longitudinally aligned sides;
  a second substantially planar mounting member bordered by two longitudinally aligned sides and two substantially lateral sides and having a top surface and a predetermined thickness along said longitudinally aligned sides, said mounting member attached at one of its said lateral sides to said first planar member at one of said lateral sides of said first planar member, said mounting member adapted to secure one end of the telescoping ramp to an elevated surface during use;
  a channel formed along each of said longitudinally aligned sides of said first and second planar members, each said channel defined by a sidewall member having an upper end and a lower end, said lower end having two substantially perpendicular bracket members attached to said sidewall member to define an inverted F-shaped cross section, each said channel coupled to said first and second planar members such that a portion of each longitudinal side of said first and second planar members is bracketed between said bracket members, and said upper end of each said channel protrudes above said top surfaces of said first and second planar members and said portion of said channel protruding above said first planar member being curved and defining an inverted J-shaped cross section;
a second ramp member sized to fit between said channels of said first ramp member, said second ramp member comprising
  a third substantially planar member bordered by two longitudinally aligned sides and two substantially lateral sides, said third planar member having a top surface and a predetermined thickness along said longitudinally aligned sides;
  a rail formed along each of said longitudinally aligned sides of said second ramp member, each said rail defined by a sidewall member having an upper end and a lower end, said lower end having two substantially perpendicular bracket members attached to said sidewall member defining an inverted F-shaped cross section, each said rail coupled to said third planar member such that a portion of each longitudinal side of said third planar member is bracketed between said bracket members, and said upper end of each said rail protrudes above said top surface of said third planar member and is complementarily shaped to slidingly fit within a corresponding inverted J-shaped channel of said first ramp member;
  wherein said second ramp member slidingly nests atop and within said longitudinal sides of said first ramp member;
  wherein when the telescoping ramp is in an extended position, a portion of each said rail of said second ramp member engages at least a portion of a corresponding said channel of said first ramp member, and
  wherein when the telescoping ramp is in a closed position, each said rail of said second ramp member is substantially within a corresponding one of each said channel of said first ramp member.

28. A telescoping ramp as claimed in claim 27 wherein a portion of said upper end of each said channel of said first ramp member that protrudes above said top surface of said second planar member tapers down to said top surface of said second planar member.

29. A telescoping ramp as claimed in claim 27 wherein each said channel of said first ramp member and each said rail of said second ramp member is made of a material from the group consisting of a plastic and an aluminum alloy.

30. A telescoping ramp as claimed in claim 27 wherein said second ramp member includes a stop member on a bottom surface of said third planar member, said stop member adapted to prevent said second ramp member from separating from said first ramp member when the telescoping ramp is in said extended position.

31. A telescoping ramp as claimed in claim 27 wherein said first ramp member includes a first stop member on said sidewall member between said upper end and said lower end; and said second ramp member includes a corresponding second stop member on said rail positioned such that upon the telescoping ramp being extended said first and second stop members abut, preventing said first and second ramp members from separating.

32. A telescoping ramp as claimed in claim 27 wherein said first ramp member includes a first stop member on said top surface of said first planar member;
  wherein said second ramp member includes a corresponding second stop member on a bottom surface of said third planar member; and
  wherein said first and second stop members are longitudinally aligned such that upon the telescoping ramp being extended said first and second stop members abut, preventing said first and second ramp members from separating.

33. A telescoping ramp as claimed in claim 27 wherein a bottom surface of said second substantially planar mounting member of said first ramp member includes at least one nonskid protrusion.

34. A telescoping ramp as claimed in claim 27 wherein said second ramp member includes a mounting extension attached to said third planar member, said mounting extension adapted to secure the telescoping ramp to a surface during use.

35. A telescoping ramp as claimed in claim 34 wherein said mounting extension is attached at an obtuse angle relative to said top surface of said third planar member of said second ramp member.

36. A telescoping ramp as claimed in claim 27 further comprising at least one reinforcement bracket shaped to surround a portion of each said channel on said first ramp member, said reinforcement bracket extending from said upper end to said lower end, and said bracket being positioned along said channel so as to strengthen said channel when the telescoping ramp is in said extended position.

37. A telescoping ramp comprising:
a first ramp member comprising
  a first substantially planar member bordered by two longitudinally aligned sides and two substantially lateral sides, said planar member having a top surface and a predetermined thickness along said longitudinally aligned sides;

a channel formed along each of said longitudinally aligned sides of said first planar member, each said channel defined by a substantially vertical sidewall member having an upper end and lower end, said lower end having at least one substantially perpendicular bracket member attached to one side of said sidewall member, each said channel coupled to said first planar member such that a portion of each longitudinal side of said first planar member is attached to said at least one bracket member such that a gap is defined between said longitudinal side and said sidewall member; and said upper end of each said channel protrudes above said top surface of said first planar member and defines an inverted L-shaped cross section;

a second ramp member sized to fit between said channels of said first ramp member, said second ramp member comprising a second substantially planar member bordered by two longitudinally aligned sides and two substantially lateral sides, said second planar member having a top surface and a predetermined thickness along said longitudinally aligned sides;

a rail formed along each of said longitudinally aligned sides of said second ramp member, each said rail defined by a substantially vertical sidewall member having an upper end and a lower end, said lower end having at least one substantially perpendicular bracket member attached to said sidewall member, each said rail coupled to said second planar member such that a portion of each longitudinal side of said second planar member is attached to said at least one bracket member; and said upper end of each said rail protrudes above said top surface of said second planar member and defines an inverted L-shaped cross section and is complementarily shaped to slidingly fit within a corresponding inverted L-shaped channel of said first ramp member;

wherein said second ramp member slidingly nests within said channels of said first ramp member;

wherein when the telescoping ramp is in an extended position, a portion of each said rail of said second ramp member engages at least a portion of a corresponding said channel of said first ramp member, and wherein when the telescoping ramp is in a closed position, each said rail of said second ramp member is substantially within a corresponding one of each said channel of said first ramp member.

38. A telescoping ramp as claimed in claim 37 further comprising a substantially planar mounting member bordered by two longitudinally aligned sides and two substantially lateral sides and having a top surface, a bottom surface and a predetermined thickness along said longitudinally aligned sides, said mounting member attached at one of its said lateral sides to said first planar member at one of said lateral sides of said first planar member, said mounting member adapted to secure one end of the telescoping ramp to an elevated surface during use.

39. A telescoping ramp as claimed in claim 38 wherein said channel formed along each of said longitudinally aligned sides of said first planar member extends to each said longitudinally aligned sides of said mounting member.

40. A telescoping ramp as claimed in claim 39 wherein each said channel extended along said longitudinally aligned sides of said mounting member tapers down to said top surface of said mounting member.

41. A telescoping ramp as claimed in claim 37 wherein each said channel of said first ramp member and each said rail of said second ramp member is made of a material from the group consisting of a plastic and an aluminum alloy.

42. A telescoping ramp as claimed in claim 37 wherein said lower end of said sidewall member of each said rail further comprises a lower extension shaped to slidingly fit within said gap between said longitudinal side of said first planar member and said sidewall member of each said channel.

43. A telescoping ramp as claimed in claim 42 wherein each said lower extension of each said rail defines an L-shaped cross section.

44. A telescoping ramp as claimed in claim 37 wherein said first ramp member includes at least one stop member attached to a portion of said channel, said stop member adapted to prevent said second ramp member from separating from said first ramp member when the telescoping ramp is in said extended position.

45. A telescoping ramp as claimed in claim 44 wherein said at least one stop member is attached to a portion of said sidewall member of said channel between said upper end and said lower end.

46. A telescoping ramp as claimed in claim 45 wherein said second ramp member includes at least one corresponding second stop member protruding outward of said rail positioned such that upon the telescoping ramp being extended said at least one stop member at said channel and second stop members abut, preventing said first and second ramp members from separating.

47. A telescoping ramp as claimed in claim 37 wherein said first ramp member includes a mounting extension attached to said first planar member at one of said lateral sides, said mounting extension adapted to secure the telescoping ramp to an elevated surface during use.

48. A telescoping ramp as claimed in claim 47 wherein said mounting extension is attached at an obtuse angle relative to a bottom surface of said first planar member of said first ramp member.

49. A telescoping ramp as claimed in claim 48 wherein a bottom side of said mounting extension includes at least one non-skid protrusion.

50. A telescoping ramp as claimed in claim 37 wherein said second ramp member includes a mounting extension attached to said second planar member, said mounting extension adapted to secure the telescoping ramp to a surface during use.

51. A telescoping ramp as claimed in claim 50 wherein said mounting extension is attached at an obtuse angle relative to said top surface of said second planar member.

52. A telescoping ramp as claimed in claim 37 further comprising at least one reinforcement bracket shaped to surround a portion of each said channel on said first ramp member, said reinforcement bracket extending from said upper end to said lower end, and said bracket being positioned along said channel so as to strengthen said channel when the telescoping ramp is in said extended position.

* * * * *